Oct. 2, 1934.  H. T. HAWKINSON  1,975,272
BRAKE EQUALIZING DEVICE
Filed Feb. 1, 1934

Inventor
H. T. Hawkinson
By Arthur H. Sturges
Attorney

Patented Oct. 2, 1934

1,975,272

UNITED STATES PATENT OFFICE 1,975,272

BRAKE EQUALIZING DEVICE

Harry T. Hawkinson, Ashland, Nebr.

Application February 1, 1934, Serial No. 709,304

2 Claims. (Cl. 188—204)

This invention relates to a brake equalizing device which is particularly adapted for use in connection with a wheel vehicle of any type and more particularly an automobile.

It is an object of the invention to provide means whereby a braking pressure applied to a brake pedal and the single lever thereof will be evenly distributed to either the front wheels of a vehicle or the rear wheels thereof or all four wheels simultaneously.

Another object of the invention is to provide a device which may be readily applied to motor vehicles already in use and also may be applied, with fewer parts, to automobiles during the construction thereof in a factory.

A further object of the invention is to provide a simple arrangement of parts which is economical in manufacture and certain of operation under all conditions of use.

Other and further objects and advantages of the invention will be understood from the following detailed description, reference being had to the accompanying drawing in which.

Figure 1:
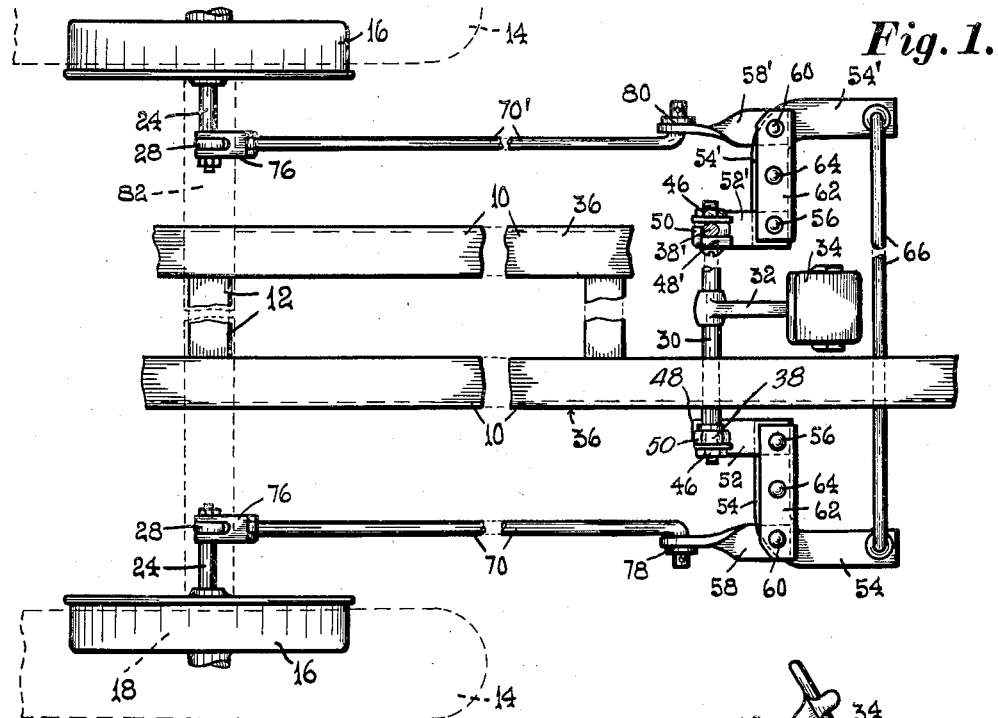
Figure 1 is a top plan view of a fragment of the chassis of a motor vehicle containing an embodiment of the present invention.

In the drawing the numeral 10 indicates the side rails of a vehicle chassis and 12 the cross members thereof. Certain portions of the rails and cross members are broken away to conserve room upon the drawing.

Figure 2:
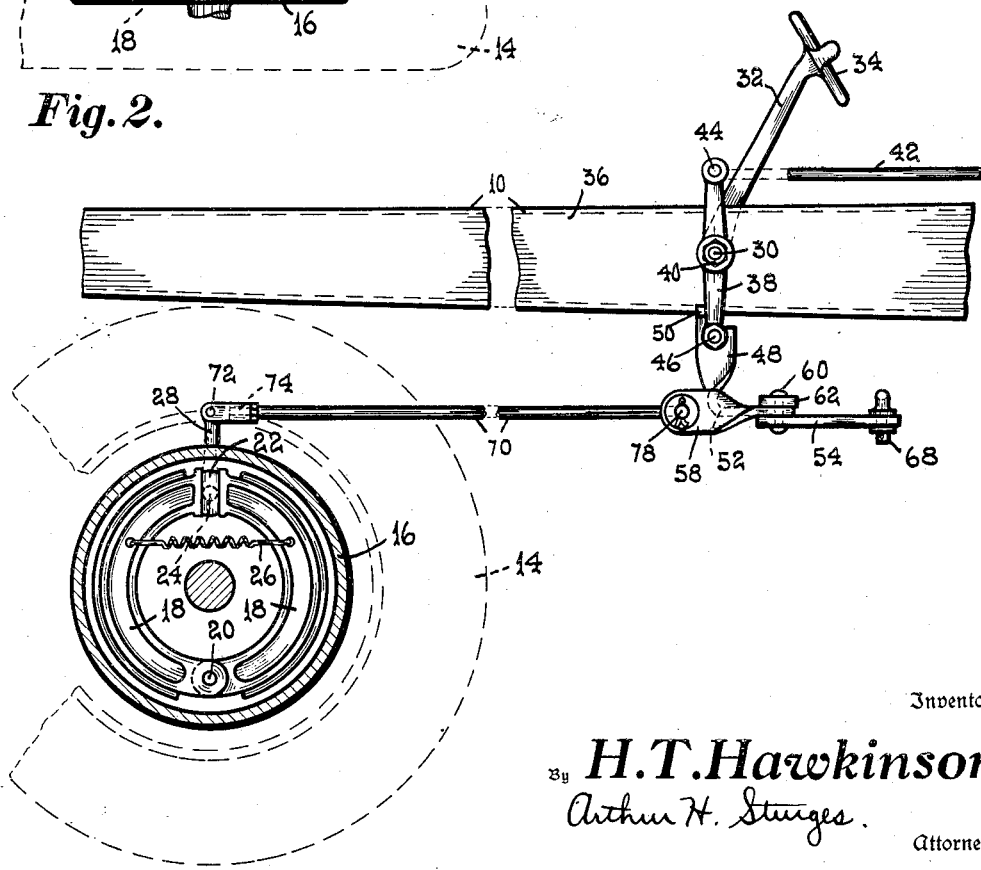
Figure 2 is a side view of the parts shown in Figure 1 certain portions thereof being in section.

The front wheels or tires of the vehicle are represented by the dotted lines 14. The front wheels are provided with brake drums 16 and internally expanding brake shoes 18 which, as best shown in Figure 2, are pivotally connected together as at 20 and are adapted to be expanded, for braking purposes, against the drums 16 at times when a dog 22 is swung. The dog 22 is pivotally mounted as at 24 through the inner wall of the brake drum housing, the said pivot being centrally positioned with respect to the dog whereby when the dog is swung an upper half portion thereof will bear against one shoe and the lower half portion thereof against the oppositely disposed shoe in a well known manner. At times when the latter described brake mechanism is released the shoes 18 move towards each other under the urge of a contracting spring 26.

The heretofore mentioned specifically described parts are conventional as is also an upstanding lever 28 which is rigidly connected to the pivot 24 together with a shaft 30 disposed transversely of the frame, a foot pedal lever 32 and a foot pedal 34. The shaft 30 is journalled through or beyond the side walls 36 of the members 10 and is provided at each of its ends with a normally substantially vertically disposed crank 38 which is secured to the shaft 30 by any suitable means which may include a nut 40.

As best shown in Figure 2, the crank 38 is so positioned on the shaft 30 that substantially half portions of the crank are oppositely disposed with respect to each other at each side of the shaft 30.

The upper end of the crank 38 may be provided with the latter herein specifically described equalizing device for applying an equalized braking pressure to the rear wheels. The action and operation of the device in conjunction with rear wheels not being specifically described herein in that it is substantially a duplication of the action of the new device in connection with the front wheels of the vehicle. In instances where the new device is applied to rear wheels a rod 42 is employed for extending from the upper half portion of the crank 38 to the braking mechanism of the rear wheels and the operation is substantially the same as that for the front wheels now to be described.

Oppositely disposed ends of the crank 38 are provided with apertures 44 and through the lower portions thereof bolts are positioned, that is to say, a bolt for the crank 38, shown in Figure 2, and its oppositely disposed mate 38' shown in Figure 1 for attaching thereto downwardly extending arms 48 and 48'. The arms are rigidly locked against movement in one direction relative to the cranks 38 by means of the fingers 50 of the respective arms bearing against the forward edge of their respective cranks 38 and 38' and, of course, any suitable means may be employed for attaching the arms 48 and 48' to the said cranks. Also it will be understood that in instances where the new device is applied to vehicles at the factory the attaching means between the arms 48 and their respective cranks may be eliminated, said arms and cranks being made integral in that case. It will be further understood that, as later described, when the brake pedal is moved forwardly the upper half portion of the cranks move forwardly and the lower half portions of the latter more rearwardly whereby in instances where a locking means is employed between the arms and cranks such as the bolts 46 and fingers 50 the fingers are placed upon the rear side of the upper half portion of the cranks.

The arms 48 and 48' are provided with horizontally disposed portions 52 and 52' which are preferably in substantial alignment with the rails 10 of the vehicle.

Bell-crank levers 54 and 54' are pivotally carried as at 56 by their respective arm portions 52 and 52'. The bell-crank levers are preferably of right angular shape in plan and adjacent the outward apex of their angles links 58 and 58' are provided and pivotally secured as at 60.

Preferably splice members 62 are secured to the bell-crank levers by any suitable means such as the rivets 64. The splice members may be utilized for providing bifurcated inner ends for the bell-crank levers 54 and 54' for mounting therebetween the horizontally disposed portions of the arms and function similarly adjacent the apex of the bell-crank levers for the links 58 and 58'. It will be understood that the splice members 62 may be eliminated by forming said members integral with the arms and that the bifurcations heretofore mentioned are merely a mechanical refinement but not absolutely necessary for the operation of the device.

The portions of the bell-crank levers which are normally in alignment with the rails 10 are coupled together by means of a link rod 66, the outer ends of the latter being pivotally secured to the arms 54 and 54' by any suitable means such as down-turning said ends and projecting the latter through their respective arms as indicated at 68 and securing the same by any suitable means such as washers and cotter pins placed through said down-turned ends.

A similar arrangement of cotter pins and washers may be employed for securing the reach rods 70 and 70' to the links 58 and 58' respectively. The forward ends of the reach rods are pivotally connected as at 72 to the levers 28 which directly operate the brake shoes and an adjustment is preferably provided whereby the reach rods may be lengthened, or shortened including threading the forward ends of the reach rods as at 74 for the reception thereof in the bifurcated members 76 which directly connect with the said levers 28. It will also be understood that, if desired, the said adjustment element may be positioned upon the link rod 66 and in such case the link rod 66 is of two piece construction and threadedly connected together.

In operation to apply an equalized braking pressure to the wheels the operator presses the foot pedal 34 forwardly thereby causing a simultaneous rearward movement of the arms 48 and 48' together with the links 58 and 58' and their connections to the front wheel brakes. It is believed to be obvious that the pressure will be evenly distributed to the front wheels through the link rod 66 which causes the oppositely disposed bell-crank levers 54 and 54' of the new device to have simultaneous and corresponding movements for forcing the consummation of the desiderative. The levers 28 also move rearwardly for expanding the shoes 18 and applying a braking force to their respective drums. The operation is substantially the same for the rear wheels of the vehicle except that the rear levers, similar to the levers 28, would move forwardly and assuming that a mechanism as heretofore described is carried by the upper half portion of the cranks 38 and 38' operating in conjunction with a rod 42 at one side of the vehicle and a rod similar thereto at the opposite side of the vehicle.

At times when the bell-crank levers 54 and 54' are moved rearwardly incident to a manipulation of the foot pedal 34 or the like they are held in an initial position with respect to each other, as shown in Figure 1, and notwithstanding their pivotal mountings at 56, on account of the reach rods 70 and 70' preventing the bell-cranks from swinging horizontally at their pivotal points 56 in one direction and the link rod 66 preventing a swinging movement horizontally in an opposite direction whereby the bell-crank levers are, in effect, substantially integral with their respective arm portions 52 and 52', at all times when an equalized braking pressure is evenly distributed between the brake mechanisms carried by the wheels 14. In instances where, initially the shoes 18 are out of adjustment or the brake lining worn out or unevenly worn or should a foreign substance, dirt or débris become lodged between the shoes and a brake drum, a slight shift or swing horizontally of the bell-crank levers is permitted for equalizing the braking pressure distributed to and between the brake mechanisms of the wheels, the functioning of the device remaining constant until the said débris becomes worn out or is otherwise removed or adjustment manually consummated; whereupon the bellcrank levers shift to a normal position as shown in Figure 1.

The pivotal connection between the link 58 and the reach rod 70 as well as the connection 80 between the like elements 58' and 70' compensate for the variation in height of the frame members 10 with respect to the axle 82 said variation being permitted by the springs of the vehicle not shown. In instances where such springs are not used the connections 78 and 80 may be eliminated, the reach-rods and links being formed integral.

From the foregoing description it is thought to be obvious that a brake equalizing device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish it to be understood as limiting myself to the precise arrangement and formation of the several parts herein shown in carrying out my invention in practice except as claimed.

What is claimed is:

1. A brake for oppositely disposed vehicle wheels each having an independent brake means comprising a shaft disposed substantially transverse of the vehicle, means for applying a braking force to the shaft, a bell-crank lever for each independent brake means of each wheel, said bell-cranks arranged to be actuated by the shaft, an arm swingable on each crank, means for locking the arms against movement in one direction, a connection between each arm and each said brake means for communicating a braking force to each said brake means, and a link between the arm connections for equalizing the braking force applied to said wheels.

2. A brake equalizing device for a wheeled vehicle having independent brake means carried by oppositely disposed wheels comprising a rotatable shaft disposed transversely of the vehicle, means for applying a braking force to the shaft, cranks carried by the shaft, an arm swingable on each crank, means for locking the arms against movement in one direction, a bell-crank swingably carried by each arm, means associated with each bell-crank for operating the brake mechanism of each wheel, and a member connecting the bell-cranks together for distributing therebetween the braking force applied to the shaft.

HARRY T. HAWKINSON.